United States Patent
Ohe et al.

[11] Patent Number: 5,393,421
[45] Date of Patent: Feb. 28, 1995

[54] APPARATUS FOR ACTIVATING SILICIC ACID IN WATER

[75] Inventors: Takeo Ohe; Norio Kawano, both of Osaka, Japan

[73] Assignee: Nippon Zoki Pharmaceutical Co., Ltd., Osaka, Japan

[21] Appl. No.: 105,845

[22] Filed: Feb. 10, 1993

[30] Foreign Application Priority Data

Feb. 14, 1992 [JP] Japan .................. 4-079404

[51] Int. Cl.$^6$ ............................................. C02F 1/48
[52] U.S. Cl. ................................ 210/223; 210/222; 210/512.1
[58] Field of Search ............... 210/222, 223, 695, 748, 210/512.1, 243; 55/100; 422/186.01, 186.02, 186.29

[56] References Cited

U.S. PATENT DOCUMENTS 4,451,436 5/1984 O'Hare ................. 422/186.29

FOREIGN PATENT DOCUMENTS

| 3632257 | 3/1988 | Germany | 210/222 |
| 2-227193 | 9/1990 | Japan . | |
| 3-221188 | 9/1991 | Japan . | |
| 283989 | 6/1969 | U.S.S.R. | 210/222 |
| 670334 | 6/1979 | U.S.S.R. | 210/222 |

Primary Examiner—Matthew O. Savage
Attorney, Agent, or Firm—Oliff & Berridge

[57] ABSTRACT

An apparatus for activating silicic acid contained in water, in which a helical antenna which generates an oscillating magnetic/electric field by use of a high-frequency power source and has a length 1, $\frac{1}{2}$ or $\frac{1}{4}$ times as long as the wavelength of the high-frequency wave is disposed in the direction of the central axis of a cylindrical tank; a water inlet pipe provided with a water injection pipe member for introducing water into the tank is disposed at the top or in the upper part of the side wall of the tank; a water drain pipe is disposed at the bottom or in the lower part of the tank; and the angle $\theta$ formed by the axis of the injection pipe and the straight line connecting a point where the axis of the injection pipe and the circumference of the tank intersect and the axis of the cylinder of the tank satisfies the equation: $0° < \theta \leq 90°$, so that water supplied into the tank forms a whirling flow that crosses the magnetic field at a right angle. Silicic acid or silicate ion contained in water can be activated in an highly effective manner by using the simple apparatus according to the invention.

13 Claims, 3 Drawing Sheets

LINES OF MAGNETIC FORCE (a)

ELECTRIC CURRENT

ELECTRIC CURRENT (b)

LINES OF MAGNETIC FORCE

APPARATUS FOR ACTIVATING SILICIC ACID IN WATER

BACKGROUND OF THE INVENTION

1. Field of the Invention

The invention relates to a water-treating apparatus for activating silicic acid contained in water. The apparatus, when applied to, e.g., a circulating water system, effectively provides circulating water in which the generation of rust and scale is prevented.

2. Description of the Related Art

Japanese Patent Application Laid-open No. Hei 2-227193 (227193/90) discloses providing water that is resistant to generating rust and/or scale by generating a magnetic field and electronic field in water channel system and passing water through the system at a constant flow rate.

Various attempts have been made to develop an apparatus which makes it possible to minimize the generation of rust and/or scale. However, it is still in a stage of trial and error.

In natural water, silicic acid is present either in the form of a monomer or in the form of a polymer of two of more monomers. It has been known that polymers of silicic acid, with the increase in the degree of polymerization, turn into a colloidal state, and the colloidal polymers of silicic acid bind to, or enclose, various organic and/or inorganic ions forming a soluble complex salt. In this specification, the phrase "activation of silicic acid" means the conversion of silicic acid monomers into such polymers.

Heretofore, conductivity meters have been used for the control of the concentration of cooling water. This is because value of electric conductivity can be an indicator of the degree of concentration of cooling water. The density of chlorine ions has also been used as a similar indicator of concentration. However, the actual concentration patterns of cooling water are highly complex and influenced in a sensitive manner by factors such as pH, temperature, etc., as well as by the nature and interactions of various solutes (such as ions and salts) contained in cooling water. The patterns therefore could not be fully defined by theory. In such a case, statistical treatment can be the most rational scientific approach.

Based on years of experience and observation of the changes of pH, free carbon dioxide and the saturation index, the present inventors have converted the electric conductivity of supplementary water (fresh water), or cooling water, chlorine ions, sulphate ions, M alkalinity, total hardness, silicic acid ions, and the data obtainable by the chemical analysis of evaporation residues into data on a concentration multiple of cooling water/supplementary water. The inventors have also found that the state of cooling water, or a circulating cooling water system, can be best grasped in a realistic manner by subjecting the data on concentration multiples to statistical treatment.

To be more specific, concentration multiples of each of the above seven items are determined for a specific sample and the average concentration multiple ($\overline{X}$) of the items is calculated therefrom. If the concentration multiple of sulphate ion is larger than the average concentration multiple $\overline{X}$ and, at the same time, the concentration multiple of M alkalinity is less than the average concentration multiple $\overline{X}$, the data show that the sample may be influenced by $SO_2$-containing exhaust gas through a cooling tower. Time series-like changes of each of the concentration multiples may indicate the possibility of the formation of scales consisting of $CaSO_4$ (calcium sulphate) or $CaSiO_2$ (calcium silicate). It is easier to determine these data quantitatively, in comparison with the case where data on chemical analysis are merely compared.

When the concentration multiples of the test items are designated as follows:

$X_1$ = Concentration multiple of electric conductivity
$X_2$ = Concentration multiple of chlorine ion
$X_3$ = Concentration multiple of sulfate ion
$X_4$ = Concentration multiple of M alkalinity
$X_5$ = Concentration multiple of total hardness
$X_6$ = Concentration multiple of silicate ion
$X_7$ = Concentration multiple of evaporation residue and their standard deviation (S) is calculated according to the following formula:

$$S = \sqrt{\frac{\Sigma(X_i - \overline{X})^2}{(7-1)}}$$

in which i = 1, 2, 3, 4, 5, 6 or 7, and the coefficient of variation (CV%) is calculated in accordance with the following formula:

$$(S/\overline{X}) \times 100,$$

there can be obtained more accurate information on the generation of rust and scale.

To be more specific, when water of a certain quality is concentrated, the value of the standard deviation remains small up to a certain concentration multiple. However, when it is concentrated beyond a certain concentration multiple, the value of the standard deviation abruptly becomes greater, and the controlling state of the cooling water becomes worse, thus causing troubles such as the generation of scale, corrosion and slime. This is because the concentration multiple of, e.g., total hardness and silicate ion drops to a value that is smaller by a large margin than $\overline{X}$. As a result, Ca, $SiO_2$ and the like are deposited from the cooling water in quantities corresponding to the margin, resulting in the formation of scale. This interpretation agrees very well with the scale and corrosion actually observed when a heat-exchanger or a boiler (steam boiler) is opened.

Based on a large number of experiments, the inventors have found that when the coefficient of variation (CV %) of a cooling water is not greater than 10%, the water is in a best controlled condition, i.e., in a state where there is no generation of scale and corrosion and that when it is less than 20%, the cooling water is still in a permissible controlled condition. Thus, the coefficient of variation can be a useful standard for the control of the quantity of water. It has also been found that it is difficult to maintain the coefficient of variation at a value not greater than 20% if the concentration multiple exceeds five even in the case where a conventional scale inhibitor is employed, although the result more or less varies depending on the quality of water.

Silicic acid contained in water plays an important role in the generation of rust and scale, as is described above in relation with Japanese Patent Application Laid-open No. Hei 2-227193. Although the mechanism has not been fully defined, it is believed that the state of silica dissolved in natural water is $H_2SiO_3$ and that it is present in an ionized state ($HSiO_3^-$). If the ionized monomers are chemically activated by gaining a large energy in some way or other, polymerization of the monomers takes place. In the course of the polymerization, they form complex salts which are soluble with metal and other ions in water, a stable suspension is formed by the peptization effect of the polymers, and a film is then formed on the surface of metal. As a result, the generation of rust, incrustation (tubercle) of rust and scale can be prevented.

The inventors have conducted extensive investigations on the method of activating silicic acid contained in water and found, quite surprisingly, that silicic acid could be effectively activated by passing silicate-containing water through an oscillating magnetic/electric field generated by linear antenna connected to a particular high-frequency power source. Under such conditions, the above-described CV% could be maintained at a value not greater than 20% without relying on cases where water was treated without any control of the concentration of silica contained therein, prior to the treatment with a magnetic/electric apparatus, and that not only the generation of rust and scale could be prevented, but the quality of the water could be improved (Japanese Patent Application Laid-open No. Hei 3-221188 (221188/91)).

In the above treatment, an apparatus is used comprising a steel pipe which is provided with an inlet and an outlet for water and in which is positioned a linear antenna of a length 1, ½ or ¼ times that of the wavelength of a high frequency wave, generated by a high frequency power source of 150 to 450 MHz which is connected to the antenna used to generate an electric field. In this case, however, the flow of water passing through the pipe is not controlled and, as a result, a turbulent flow or a laminar flow parallel to the axis of the linear antenna is formed. It is therefore impossible to retain water in the electric/magnetic field for a period of time sufficient to activate the silicic acid contained in the water. Hence the generation of rust and scale could not be prevented to a sufficient degree.

SUMMARY OF THE INVENTION

The inventors have conducted intensive investigation with regard to the direction and magnitude of magnetic and electric fields generated by antenna, the direction and flow rate of water, and the like. As a result, it has been found that the activation of silicic acid in water can be most effectively carried out so that water that generates rust and scale in only small quantities can be obtained when the flow of water is allowed to cross the magnetic field at a right angle and the flow of water is controlled in such a manner that the flow of water crossing the magnetic field is allowed to stay in the magnetic field for the longest period of time possible. The present invention has been accomplished on the basis of the above finding.

It is an object of the present invention to provide a water treatment apparatus comprising structures for controlling the direction of the flow of water so that the direction of the flow of water can be at a right angle, or as close as possible to such, to the direction of the magnetic field of an oscillating magnetic/electric field generated by a high-frequency power source, the apparatus being selectively provided with a helical antenna instead of a linear antenna.

BRIEF DESCRIPTION OF THE DRAWINGS

FIGS. 2A to 2D show a water treatment apparatus according to the invention in which FIG. 2A is a plan view of the apparatus, FIG. 2B is a cross-sectional side view thereof, FIG. 2C is a side view thereof, and FIG. 2D is a cross-sectional view of the upper part of the apparatus;

DETAILED DESCRIPTION OF THE INVENTION

Figure 2A:
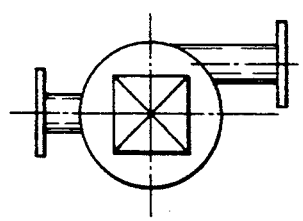
Figure 2D:
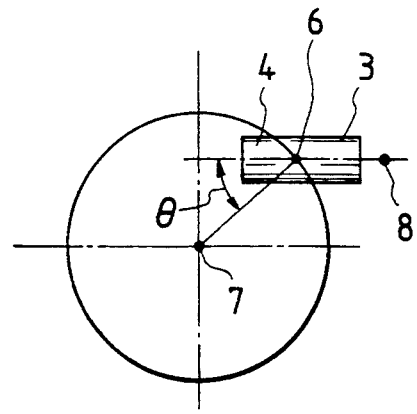
Figure 2B:
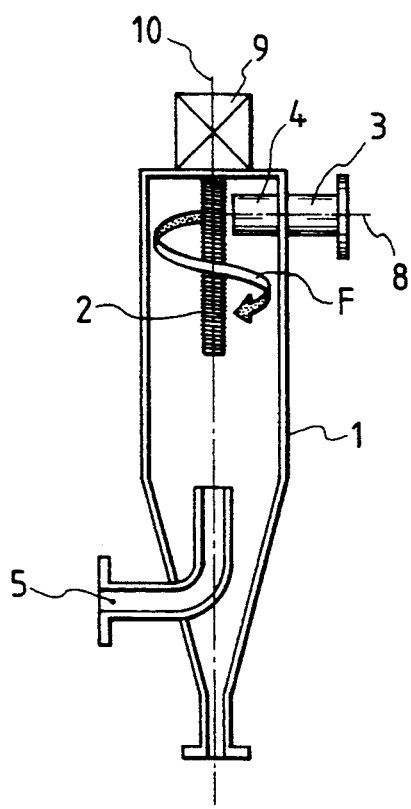
Figure 2C:
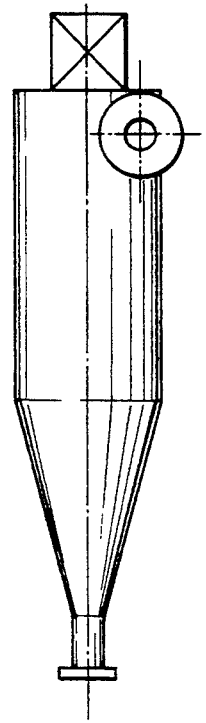

There is provided by the invention an apparatus for activating silicic acid (or silicate ion) contained in water, in which a helical antenna 2, which generates an oscillating magnetic/electric field by use of a high-frequency power source of ca. 150 to 450 MHz and has a length 1, ½ or ¼ times as long as that of the wavelength of high frequency wave generated by the high-frequency power source, is disposed along the central axis 10 of a cylindrical tank 1; a water inlet pipe 3, provided with a water injection pipe member 4 is disposed at the top, or in the upper part of the side wall of the cylindrical tank 1, in such a manner that the water injection pipe member 4 is projected into the tank 1 with the axis of the pipe member 4 extending in a horizontal direction or in a direction perpendicular to the central axis 10 (as shown in FIGS. 2B and 2C); a water drain pipe 5 having an inlet and an outlet is disposed at the bottom or in the lower part of the tank; and the angle $\theta$ formed by the axis of the water injection pipe member 4 and a straight line connecting a point where the axis of the water injection pipe member 4 and the circumference of the cylindrical tank intersect and the center 7 of the cylinder of the cylindrical tank 1 satisfies the following equation:

$$0°<\theta\leq 90°.$$

There is no particular restriction on the size of the cylindrical tank 1. The diameter of the tank may be in the range of from about 5 to about 20 cm, and its height may be in the range of from about 20 to about 200 cm. The tank may be made of any materials such as steel, stainless steel, plastic, and the like.

Figure 1A:
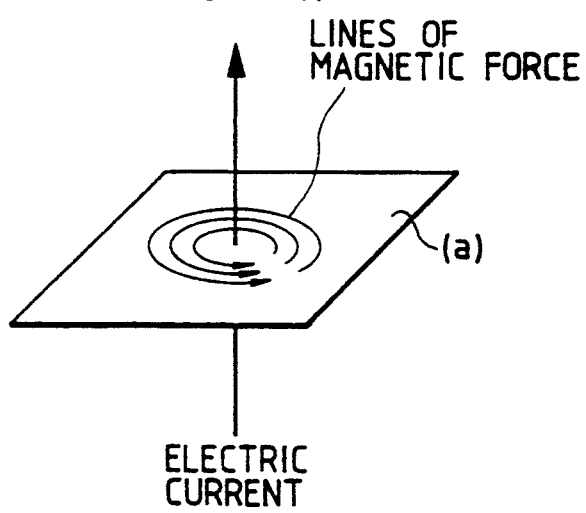
FIG. 1A is an explanatory drawing showing a magnetic plane (a) generated when an electric current is allowed to flow through a linear antenna (A) in the direction shown by an arrow as known in the prior art.
Figure 1B:
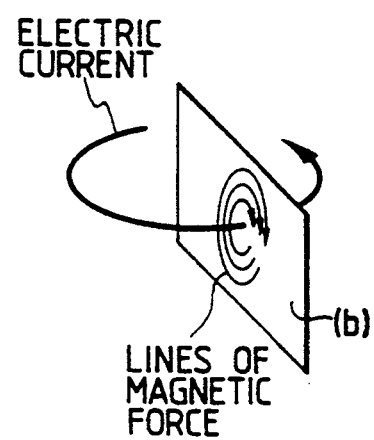
FIG. 1B is an explanatory drawing showing a magnetic plane (b) generated when electric current is allowed to flow through a helical antenna (B) in the direction shown by an arrow.

In the apparatus according to the invention, a helical antenna 2 is connected to a high- frequency power source 9 of approximately 150 to 450 MHz, so as to generate an oscillating magnetic/electric field whose frequency is in accord with the characteristic vibration of silica or silicate ion. The length of the helical antenna to be used is usually 1, ½ or ¼ of the wavelength. For example, the helical antenna may have a length of approximately 1000 mm, 500 mm or 250 mm reduced to a linear antenna. The winding diameter is 5 to 20 mm, preferably about 10 mm. The antenna is made of a conductive material, such as stainless steel, iron, steel, copper or the like. In a preferred embodiment, a high-frequency power source of 300 MHz (wavelength=approximately 1 meter) is connected to the antenna and operated at an output of approximately 1 W, which causes an electric current flowing through the antenna of approximately 10 mA and generates an oscillating magnetic/electric field that matches with the characteristic vibration of silica or silicate ion to be activated. Since the helical antenna 2 extends along the central axis 10 of the cylindrical tank 1, a magnetic field is formed in a plane (b) perpendicular to the antenna line, as is schematically shown in FIG. 1B. (In FIG. 1A is shown a magnetic plane (a) generated by an ordinary linear antenna.)

In the apparatus according to the invention, an inlet for introducing water into the cylindrical tank housing the helical antenna and an outlet for discharging treated water are disposed in a unique manner characteristic to the invention. In a preferred embodiment shown in FIG. 2, for example, a water-inlet pipe 3 having a water injection pipe member 4 is disposed at the top or in an upper area of the side wall of the cylindrical tank 1 with the water injection pipe member 4 projected into the interior of the tank in the horizontal direction. In the lower part or at the bottom of the tank is disposed a drain pipe 5 for discharging water. The tank 1 may be either of a closed type or of a type of a tank the top of which opens. However, a closed tank can be advantageous in that water can be circulated by force with application of pressure. (Although the water-inlet pipe 3 and the water injection pipe member 4 are shown in FIGS. 2A to 2D as a solid, integrated piece of pipe, they may take a different form as is described hereinbelow.)

The angle ($\theta$) between the axis 8 of the water injection pipe member 4 and the straight line connecting the opening edge 6 of the water injection pipe member 4 and the center 7 of the cylinder of the cylindrical tank 1 must satisfy the following equation: $0° < \theta \leq 90°$ (FIG. 2D). This is an important, characteristic feature of the present invention. With this constitution, there is formed a whirling flow (F) of water flowing in such a manner that it moves downward to the drain area, crossing at a right angle to the magnetic field generated by the helical antenna. In the cylindrical tank, water always proceeds to cross the magnetic field at a right angle and hence the flow of water can be controlled quite easily in a simple manner.

It would be readily understood that an angle $\theta$ of 90° or around 90° can be most preferred since a whirling flow of water that always crosses the magnetic field at a right angle always results. However, a whirling flow of water that crosses the magnetic field generated by the helical antenna can be formed in any case except when the angle $\theta$ is 0°. As a result, the water can be treated far more effectively, compared to the case of the prior apparatus which uses a linear antenna and a pipe provided with a combination of a simple inlet and an outlet for water.

The water injection pipe member 4 and the water-inlet pipe 3 of the invention can be formed linearly in an integral manner. Alternatively, they can be in the form of T-letter composed of separate members.

The whirling water can flow either clockwise or counterclockwise. The outlet of water can be located at any position remote from the inlet. It can however be advantagous to dispose the outlet at a position as remote as possible from the inlet, preferably at the lower part of the cylinder or therearound, so as to attain better treatment effects.

In the apparatus according to the invention, water flow is formed at a right angle to the magnetic field or in the tangential direction to the concentric circle centered at the central axis of the helical antenna (or the central axis of the cylinder). The silicic acid or silicate ion contained in the water moves together with the whirling flow of water. Because of this, electromagnetic waves having a frequency capable of causing the resonance of silicate molecules are generated in the direction perpendicular to the flow of the water and, hence, the activation of silicic acid can be obtained in a most effective manner.

In the prior art in which water forms a turbulent flow, only a small portion of water (i.e. , only a small portion of silicic acid) crosses the magnetic field and electric field at a right angle and the rest passes through the apparatus without being significantly influenced by the electric/magnetic field, thus resulting in a relatively poor activation effect.

In addition, in the apparatus according to the invention, water passes through a closed cylindrical tank in the form of a whirling flow with only a small pressure loss. In particular, in the case where a cyclone-type cylindrical tank is employed, solid-liquid separation can also be conducted in an effective manner based on the cyclone effect, and hence solid contaminants contained in the water, such as debris consisting of scale, sand, colloidal salts of silicic acid, etc., can be separated in an extremely efficient manner and removed through a port located at the free end of a conical portion as shown in FIG. 2B.

By use of the apparatus according to the invention, water can be effectively treated at a flow rate in the range of from 0.2 to 200 m$^3$/hour. The diameter of the cylindrical tank may be varied depending on the quantity of water to be treated and the flow rate. In usual cases, it is in the range of from about 5 to about 20 cm.

When water is treated by using the apparatus of the invention, silicic acid contained in water can be activated in an extremely effective manner. By using water treated by the apparatus, the formation of rust and/or scale in circulating water systems of, e.g., boilers and cooling towers, as well as in non-circulating systems of, e.g., water-supplying lines can be effectively prevented. The quality of the water treated by the apparatus is excellent and can be highly useful in various fields, including the food industry and the beverage industry.

The mechanism is not been fully understood by which the silicic acid is activated when water is passed through an oscillating magnetic/electric field generated by a helical antenna connected to a high-frequency power source. It is however thought that silica dissolved in natural water is present in an ionized state ($HSiO_3^-$). If the ionized monomers are chemically activated by gaining a large energy in some way or other, polymerization of the monomers takes place. In the course of the polymerization, they form complex salts with metal and other ions dissolved in water. A stable suspension is formed by the peptization effect of the polymers and a film is then formed on the surface of metal. As a result, the generation of rust, incrustation (tubercles) of rust and scale can be prevented.

The present invention will further be illustrated by examples. and the coefficient of variation (CV%) is calculated in accordance

EXAMPLE 1 AND COMPARATIVE EXAMPLE 1

Figure 3:
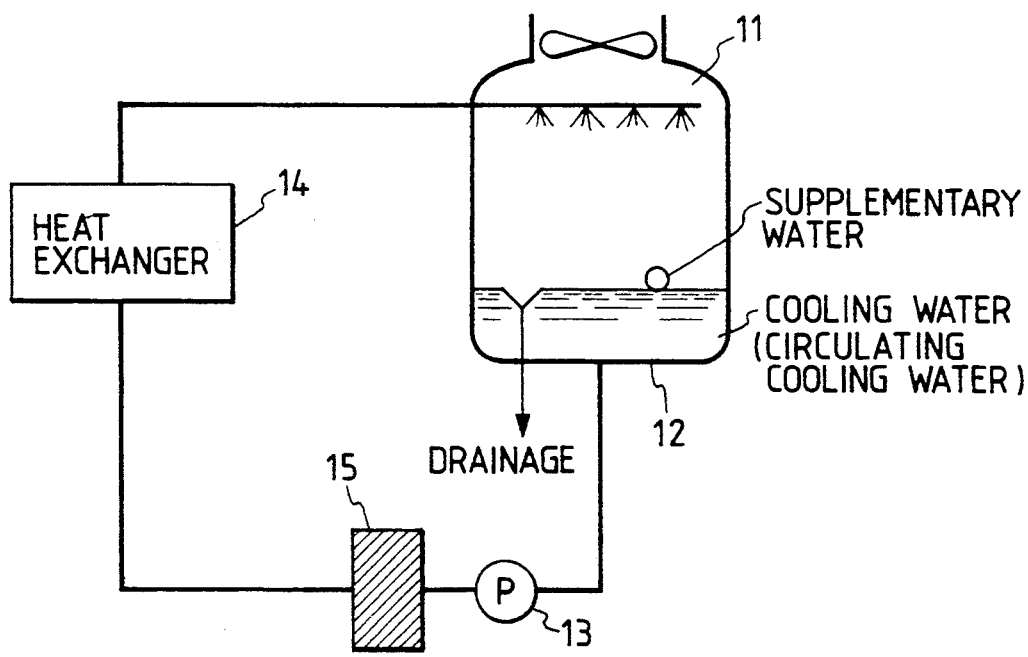
FIG. 3 is a schematic view showing a circulating cooling water system line to which an apparatus according to the invention is applied.

A water treatment apparatus according to the present invention, as shown by FIGS. 2A to 2D, was used in a circulating cooling water system line shown by FIG. 3. In FIG. 3, cooling water is circulated by a pump 13 from the lower part 12 of an open cooling tower via heat exchanger 14 to the upper part 11 of the cooling tower, in which the concentration of the circulating water is gradually raised during spraying of cooling water. Supplementary water was occasionally fed to the cooling tower. The water treatment apparatus (15 in FIG. 3) of the invention was disposed between the pump 13 and the heat exchanger 14. The apparatus 15 used was one of the type shown in FIG. 2, in which a ½ wavelength stainless steel helical antenna having a diameter of approximately 3 mm, a wire length of approximately 500 mm and with winding diameter of 10 mm and a winding distance of about 0.5 mm was housed along the central axis of a cylindrical tank having a diameter of approximately 20 cm and a length of approximately 150 cm. The helical antenna was connected to a high-frequency power source of approximately 300 MHz positioned outside of the tank and the angle $\theta$ formed by the axis of the water injection pipe member and the straight line connecting the center of the cylinder and the open end of the water injection pipe was set at 90°. For the purpose of comparison, a control experiment was carried out under the same conditions (output power, 1 W; antenna current approximately 10 mA; and frequency approximately 300 MHz) except that a linear antenna having the same wire length was used. Industrial water having a composition set forth in Table 1 was used as supplementary water and the system was operated using electric conductivity as the criterion. Water was flowed through the apparatus 15 at a rate of 50 m³/hour.

At the time when the electric conductivity of water reached approximately 450 µs/cm, samples of the circulating waters were taken from the two systems and analyzed. Results obtained are shown in Table 1.

TABLE 1

| | Supplementary Water | Comparative Example 1 Cooling water (Axial flow, Rod antenna) | Times | Example 1 Cooling water (Whirling flow, Helical antenna) | Times |
| --- | --- | --- | --- | --- | --- |
| pH | 6.8/21° C. | 8.2/21° C. | | 8.5/21° C. | |
| Conductivity (µS/cm) | 90 | 440 | 4.89 | 450 | 5.00 |
| Cl⁻ (mg/l) | 9.2 | 34 | 3.70 | 36 | 3.91 |
| SO² (mg/l) | 6.1 | 39 | 6.39 | 40 | 6.56 |
| M Alkalinity (mg/l) | 22 | 100 | 4.55 | 110 | 5.00 |
| Total Hardness (mg/l) | 26 | 110 | 4.23 | 130 | 5.00 |
| SiO₂ (mg/l) | 16 | 43 | 2.69 | 61 | 3.81 |
| Fe (mg/l) | 0.17 | 0.32 | — | ND | — |
| Evaporation residue | 63 | 330 | 5.24 | 340 | 5.40 |
| X | | 4.526 | | 4.954 | |
| S | | 1.171 | | 0.929 | |
| Coefficient of variation | | 25.8% | | 18.8% | |

The data in Table 1 clearly show an increase in the concentration multiple of SiO₂ and a decrease in the coefficient of variations. Further, it was observed that, in the case where the combination of helical antenna and the whirling flow were employed, the green algae could be removed in an apparently larger quantity from the internal wall surface of the cooling tower than in the case where the rod antenna and the axial flow were employed.

EXAMPLE 2 AND COMPARATIVE EXAMPLE 2

Figure 4:
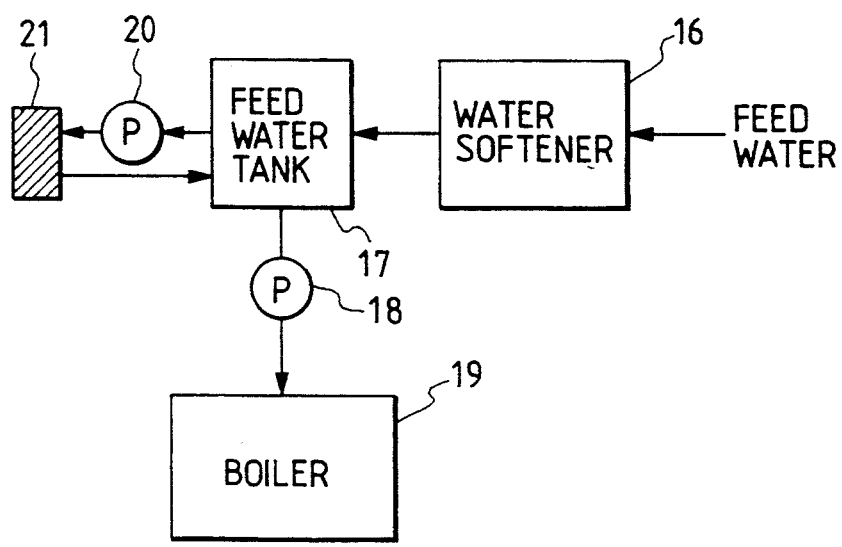
FIG. 4 is a schematic view showing a boiler feed system to which an apparatus according to the invention is applied.

A water-treating apparatus 21 indentical with the one (15) used in Example 1 was applied to a boiler system shown in FIG. 4, wherein water is fed to a feed water tank 17 via water softener 16. The water is then sent by a pump 18 to a boiler 19. In order to treat the water contained in the feed water tank 17, the water was sent by a pump 20 to the apparatus 21 and then circulated to the feed water tank 17. For the purpose of comparision, the same operation was carried out under the same conditions, except that a water-treating apparatus of a rod antenna type identical with the one used in Example 1 was used. The softened water supplied had a composition as set forth in Table 2. The output of the apparatus was set at approximately 1 W. The current flowing through the antenna was approximately 10 mA. Water was allowed to flow through the apparatus at a rate of approximately 15 m³/hour. The boilers were operated with a supply of soft water until the electric conductivity of the soft water reached ca. 3620 µs/cm, which was ca. 310 µs/cm at the initial stage of the operation, and the waters in the boilers were sampled and analyzed. Results obtained are shown in Table 2.

TABLE 2

| | Soft water | Comparative Example 1 Boiler water (Axial flow, Rod antenna) | Concentration multiple | Example 1 Boiler water (Whirling flow, Helical antenna) | Concentration multiple |
| --- | --- | --- | --- | --- | --- |
| pH | 6.4/16° C. | 11.5/17° C. | | 11.1/16° C. | |
| Conductivity (µS/cm) | 310 | 3670 | 11.84 | 3620 | 11.68 |
| Chlorine ion (ml/l) | 14 | 250 | 17.86 | 240 | 17.14 |
| Sulphate ion (ml/l) | 44 | 590 | 13.41 | 610 | 13.86 |

TABLE 2-continued

|  | Soft water | Comparative Example 1 | | Example 1 | |
|---|---|---|---|---|---|
|  |  | Boiler water (Axial flow, Rod antenna) | Concentration multiple | Boiler water (Whirling flow, Helical antenna) | Concentration multiple |
| M Alkalinity (mg/l) | 80 | 940 | 11.75 | 950 | 11.88 |
| Total Hardness (mg/l) | 1.0 | 0 | — | 0 | — |
| Silicate ion (mg/l) | 48 | 580 | 12.08 | 590 | 12.29 |
| Total Fe ion (mg/l) | 0.11 | 0.58 | — | 0.23 | — |
| Evaporation residue (mg/l) | 220 | 2840 | 12.91 | 2650 | 12.01 |
| Sodium ion (mg/l) | 56 | 720 | 12.86 | 680 | 12.14 |
| X |  | 13.244 |  | 13.006 |  |
| S |  | 2.127 |  | 1.959 |  |
| Coefficient of variation |  | 16.1% |  | 15.1% |  |

The data in Table 2 shows significant increases in the concentration multiple of silicate ions and a decrease in coefficient of variations, as well as reduction in total iron ions. This proves the high effectiveness of the combination of the whirling flow and the helical antenna. The heat-exchanging parts in the boilers were examined with an endoscope. As a result, it was found that the exfoliation of the scale generated by the hardening of the soft water was distinct in the case where the combination of the whirling flow and the helical antenna was used.

What is claimed is

1. An apparatus for activating silicic acid contained in water, comprising:
   a cylindrical tank having a central axis, a first end and a second end;
   a high-frequency power source for generating an output of 150 to 450 MHz;
   a helical antenna disposed within the cylindrical tank coaxially along the central axis of the cylindrical tank, for generating an oscillating electromagnetic field using said output of the high-frequency power source of 150 to 450 MHz, the helical antenna has a length 1, $\frac{1}{2}$ or $\frac{1}{4}$ times as long as that of the wavelength of the high frequency wave generated by the high-frequency power source;
   a water inlet pipe provided with a water injection pipe member disposed at a part of a side wall proximate the first end of the cylindrical tank in such a manner that the water injection pipe member is projected into the cylindrical tank with its axis perpendicular to an axis located on the side wall of the cylindrical tank that is parallel to the central axis of the cylindrical tank; and
   a water drain pipe disposed at or proximate the second end of the cylindrical tank, wherein an angle $\theta$ formed by the axis of said water injection pipe member and a straight line connecting a point along the axis of the water injection pipe member where it intersects the side wall of the cylindrical tank and the central axis satisfies the equation:
   $0° < \theta \leq 90°$.

2. The apparatus as claimed in claim 1, wherein said angle $\theta$ is about 90°.

3. The apparatus as claimed in claim 1, wherein the cylindrical tank is a cyclone type tank comprising the cylindrical tank as a first part and the second end comprises a second part having the shape of a cone.

4. An apparatus for activating silicic acid contained in water, comprising:
   a cylindrical tank having a central axis, a first end and a second end;
   a helical antenna disposed within the cylindrical tank coaxially along the central axis of the cylindrical tank;
   a high frequency power source that generates an oscillating electromagnetic field in the range of 150–450 MHz and is connected to the helical antenna;
   a water inlet pipe provided with a water injection pipe member positioned at a part of a side wall of and projecting into the cylindrical tank proximate the first end, the water injection pipe member having an axis parallel to a diameter of said cylindrical tank but positioned to a side of and parallel with the diameter so as to induce a swirling motion when water is introduced into the cylindrical tank; and
   a water drain pipe disposed at or proximate the second end of the cylindrical tank.

5. The apparatus as claimed in claim 4, wherein the helical antenna has a length, 1, $\frac{1}{2}$ or $\frac{1}{4}$ times as long as that of the wave length of the high frequency wave generated by the high frequency power source.

6. The apparatus as claimed in claim 4, wherein an angle $\theta$ defined by the axis of the water injection pipe member and a straight line connecting a point along the axis of the water injection pipe member where it intersects a circumference of the cylindrical tank with the central axis of the cylindrical tank satisfies the condition: $0° < \theta \leq$ to 90°.

7. The apparatus as claimed in claim 6, wherein the angle $\theta$ is such that water is injected substantially tangentially to an inner circumference of the cylindrical tank.

8. An apparatus for activating silicic acid contained in water, comprising:
   a cylindrical tank having a central axis, a first end and a second end;
   a high frequency power source having an output in the range of 150 to 450 MHz;
   a helical antenna disposed within the cylindrical tank coaxially along the central axis of the cylindrical tank, said helical antenna electrically connected to the high frequency power source and having a length that is a one of 1, ½ and ¼ as long as the wavelength of the high frequency wave generated by the high-frequency power source;

a water injection pipe member mounted at the first end of and projecting into said cylindrical tank, the water injection pipe member having an axis perpendicular to the central axis and being aligned such that an angle $\theta$ defined by a straight line between a point where the axis of the water injection pipe member intersects a wall of the cylinder tank and the central axis and a line along the axis of the water injection pipe member satisfies the limits:

$$0° < \theta \leq 90°;$$

a second portion mounted to the second end of the cylindrical tank; and a water drain pipe having an inlet substantially at the second end of the cylindrical tank.

9. The apparatus as claimed in claim 8, wherein the water drain pipe passes through a wall of the second portion.

10. The apparatus as claimed in claim 8, wherein angle $\theta$ is in the range of 80 to 90 degrees.

11. The apparatus as claimed in claim 8, wherein said second portion has an inwardly sloped conical wall extending from the second end of the cylindrical tank, said inwardly sloped wall sloping from a circumference toward an extension of said central axis of said cylindrical tank.

12. The apparatus as claimed in claim 8, wherein the second portion has a conical shape.

13. The apparatus as claimed in claim 8, wherein a free end of the second portion has a port for removing solid contaminants.

* * * * *

UNITED STATES PATENT AND TRADEMARK OFFICE
CERTIFICATE OF CORRECTION

PATENT NO.  : 5,393,421
DATED       : February 28, 1995
INVENTOR(S) : Takeo OHE; Norio KAWANO It is certified that error appears in the above-identified patent and that said Letters Patent is hereby corrected as shown below:

On the title page:

In item [21], change "105,845" to --015,845--.

Signed and Sealed this

Twenty-eighth Day of November 1995

Attest:

BRUCE LEHMAN

Attesting Officer

Commissioner of Patents and Trademarks